United States Patent
Cao et al.

(10) Patent No.: US 6,712,877 B2
(45) Date of Patent: Mar. 30, 2004

(54) OXYGEN CONCENTRATOR SYSTEM

(75) Inventors: Tuan Q. Cao, Davenport, IA (US); Gary Byrd, Donahue, IA (US); Lyle Berkenbosch, Bettendorf, IA (US); Craig Schledewitz, Davenport, IA (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/228,134

(22) Filed: Aug. 27, 2002

(65) Prior Publication Data

US 2004/0040439 A1 Mar. 4, 2004

(51) Int. Cl.$^7$ .................................. B01D 53/053
(52) U.S. Cl. ................... 95/10; 95/8; 95/19; 95/96; 95/130; 96/111; 96/113; 96/130; 96/144
(58) Field of Search .................. 95/8, 10–12, 19, 95/21, 22, 96–98, 100–105, 117–119, 122, 130; 96/110, 111, 113–115, 130, 143, 144

(56) References Cited

U.S. PATENT DOCUMENTS

| | | | | |
|---|---|---|---|---|
| 3,922,149 A | * | 11/1975 | Ruder et al. ................ 95/22 |
| 4,428,372 A | * | 1/1984 | Beysel et al. ........ 128/202.26 |
| 4,491,459 A | * | 1/1985 | Pinkerton ................ 96/113 |
| 4,545,790 A | * | 10/1985 | Miller et al. .............. 96/117 |
| 4,661,124 A | * | 4/1987 | Hamlin et al. .............. 95/21 |
| 4,927,434 A | * | 5/1990 | Cordes et al. .............. 95/15 |
| 4,948,391 A |   | 8/1990 | Noguchi .................. 55/26 |
| 5,071,453 A | * | 12/1991 | Hradek et al. ............ 96/111 |
| 5,171,336 A | * | 12/1992 | Shulick .................. 96/115 |
| 5,340,381 A | * | 8/1994 | Vorih ..................... 95/21 |
| RE35,099 E | * | 11/1995 | Hill ....................... 95/98 |
| 5,486,226 A | * | 1/1996 | Ross et al. ................ 95/11 |
| 5,505,765 A | * | 4/1996 | Kaji et al. ............... 95/100 |
| 5,529,607 A | * | 6/1996 | Tan ....................... 95/12 |
| 5,730,778 A | * | 3/1998 | Hill et al. ................. 95/12 |
| 5,746,806 A | * | 5/1998 | Aylsworth et al. ............ 95/8 |
| 5,858,062 A | * | 1/1999 | McCulloh et al. ............ 95/8 |
| 5,858,063 A | * | 1/1999 | Cao et al. ................. 95/11 |
| 5,917,135 A | * | 6/1999 | Michaels et al. ............ 95/11 |
| 6,146,447 A | * | 11/2000 | Sircar et al. .............. 95/101 |
| 6,156,101 A | * | 12/2000 | Naheiri .................. 95/101 |
| 6,183,538 B1 | * | 2/2001 | Naheiri .................. 95/98 |
| 6,200,365 B1 | * | 3/2001 | Eimer et al. .............. 95/19 |
| 6,342,090 B1 | * | 1/2002 | Cao ....................... 95/23 |

\* cited by examiner

*Primary Examiner*—Robert H. Spitzer
(74) *Attorney, Agent, or Firm*—Lowe Hauptman Gilman & Berner, LLP

(57) ABSTRACT

An oxygen concentrator system includes at least one oxygen concentrator sub-system and a plenum subsystem. The at least one oxygen concentrator sub-system produces oxygen-enriched air which is outputted to both the oxygen concentrator system output and to a plenum chamber within the plenum subsystem. The plenum chamber is trickle charged with the oxygen-enriched air when the at least one oxygen concentrator sub-system produces an excess amount of oxygen-enriched air. Should the demand for oxygen-enriched air exceed the capability of the at least one oxygen concentrator sub-system, additional oxygen-enriched air is provided by the plenum chamber until such time that the capability of the at least one oxygen concentrator sub-system exceeds the demand of oxygen-enriched air. At that time, oxygen-enriched air is no longer provided by the plenum chamber but rather the plenum chamber is again trickle charged.

35 Claims, 7 Drawing Sheets

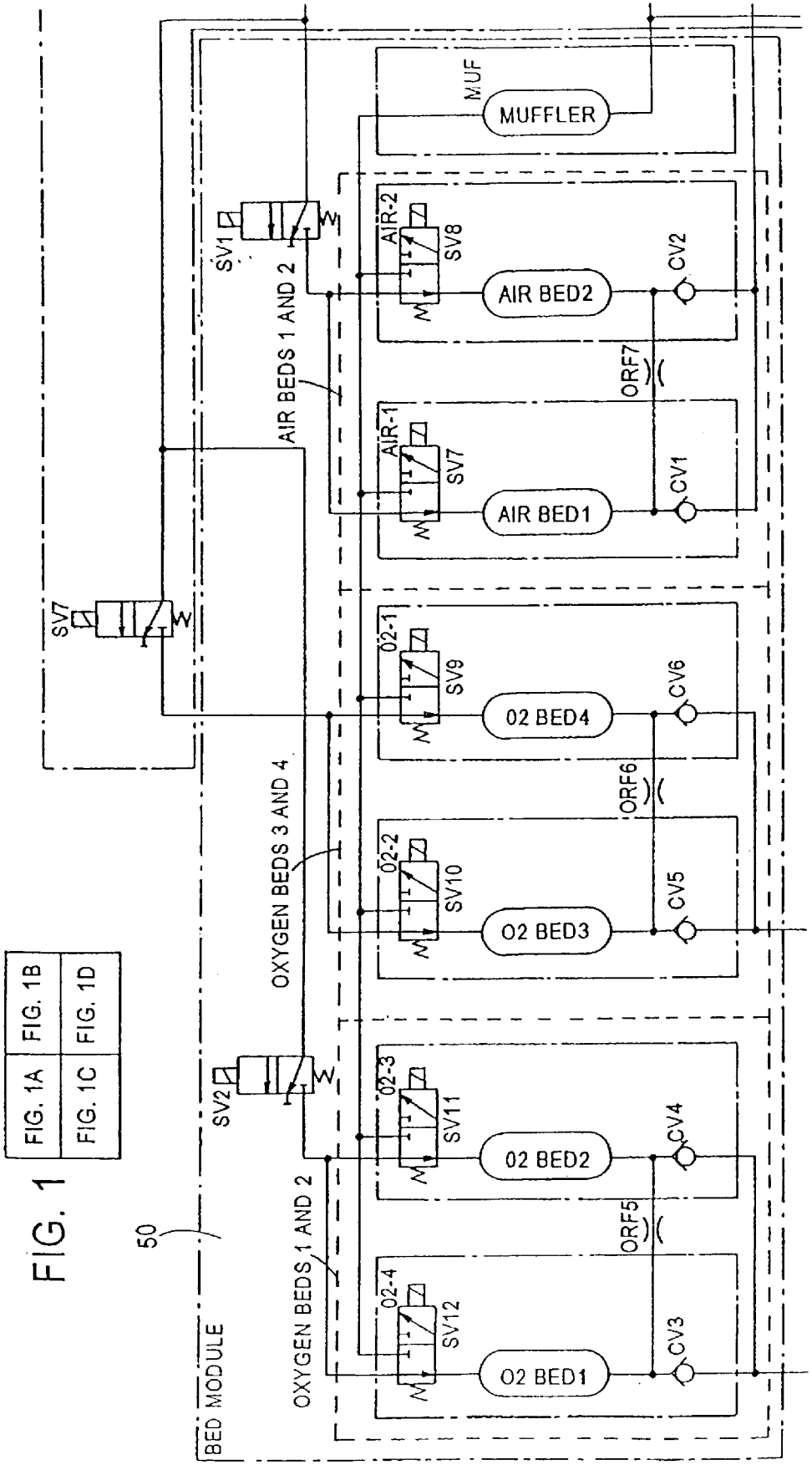

OXYGEN CONCENTRATOR SYSTEM

CROSS-REFERENCE TO RELATED APPLICATIONS

The present application is related to co-pending application, entitled "OXYGEN CONCENTRATOR SYSTEM WITH ALTITUDE COMPENSATION", Ser. No. 10/227,806, filed Aug. 27, 2002.

BACKGROUND OF THE INVENTION

1. Field of the Invention

The present invention relates to oxygen concentrator systems, and more particularly, to a patient ventilator oxygen concentrator system in which a plenum is used to provide a sufficient flow of oxygen-enriched product under various conditions. The plenum may be selectively bypassed to improve the transient response of the concentrator system. Furthermore, the plenum may be trickle charged when needed so as to maintain the reserve capacity of the plenum.

2. Description of the Related Art

Many medical applications exist that require either oxygen-enriched product or medical grade air. Both are widely used in respiratory care treatments, for example. Furthermore, both oxygen-enriched product and medical grade air are used to power various pneumatically driven medical devices.

Hospitals and other medical care facilities have a need for both oxygen-enriched product and medical grade air. In military hospitals and in hospitals in Europe, for example, these needs may be met by using oxygen concentration systems to provide oxygen-enriched product and by using a filtration system for providing medical grade air. On the other hand, hospitals and other medical care facilities in the United States often use high-pressure gas systems or liquid oxygen to gaseous conversion systems to provide oxygen-enriched product.

Commonly used oxygen concentration systems often employ a pressure swing adsorption (PSA) process to remove nitrogen from a given volume of air to produce oxygen-enriched product. Such a process is disclosed in U.S. Pat. No. 4,948,391 to Noguchi and this patent is incorporated herein by reference in its entirety.

In such oxygen concentration systems, for example, as the plenum pressure is increased, the product flow output, that is, the oxygen-enriched product output, is decreased and the oxygen concentration increased. Accordingly, at low plenum pressures, the oxygen concentration of the oxygen-enriched product output may be insufficient.

SUMMARY OF THE INVENTION

It is an object of the present invention to provide an oxygen concentrator system which utilizes at least one oxygen concentrator subsystem and a plenum to provide an oxygen-enriched product output.

It is a further object of the present invention to provide an oxygen concentrator system as above and including a plenum charging system to meter and to control the flow of product between the at least one oxygen concentrator subsystem and the plenum and to allow the flow of oxygen product only from the at least one oxygen concentrator subsystem to the plenum. The plenum is trickle charged when needed to maintain its reserve capacity.

It is another object of the present invention to provide an oxygen concentrator system as above and further including a discharging check valve to selectively allow the plenum reserve capacity to flow out only during a high demand oxygen flow.

It is yet another object of the present invention to provide an oxygen concentrator system as above and further including a plenum bypass valve to make the transient response faster and to avoid overdrawing the at least one oxygen concentrator subsystem so as to keep the oxygen concentration of the oxygen-enriched air above a predetermined minimum value.

These and other objects of the present invention are achieved by an oxygen concentrator system comprising: a system air inlet to receive supply air; at least one system outlet to output oxygen-enriched product; at least one oxygen concentrator subsystem including an input to receive supply air from the system air inlet and an output to output oxygen-enriched product to the at least one system outlet; a plenum and a plenum charging system located between the output of the at least one oxygen concentrator subsystem and the at least one system outlet, the plenum charging system selectively enabling oxygen-enriched product to flow from the at least one oxygen concentrator subsystem to the plenum; and an optional plenum bypass valve to selectively bypass the plenum so as to enable oxygen-enriched air to flow from the at least one oxygen concentrator subsystem to the at least one system outlet.

The foregoing and other objects of the present invention are achieved by a method of increasing oxygen concentration, the method comprising: receiving supply air from a system air inlet at an input of at least one oxygen concentrator subsystem and outputting oxygen-enriched product to at least one system outlet; selectively enabling oxygen-enriched air to flow from the at least one oxygen concentrator subsystem to the plenum; and selectively bypassing the plenum to enable oxygen-enriched product to flow from the at least one oxygen concentrator system to the at least one system outlet.

The foregoing and a better understanding of the present invention will become apparent from the following detailed description of an example embodiment and the claims when read in connection with the accompanying drawings, all forming a part of the disclosure of this invention. While the foregoing and following written and illustrated disclosure focuses on disclosing an example embodiment of the invention, it should be clearly understood that the same is by way of illustration and example only and that the invention is not limited thereto. This spirit and scope of the present invention are limited only by the terms of the appended claims.

BRIEF DESCRIPTION OF THE DRAWINGS

The following represents brief descriptions of the drawings, wherein:

FIGS. 1A–1D together form a pneumatic diagram of a patient ventilator oxygen concentrator system in accordance with an example embodiment of the present invention wherein FIG. 1 is divided into four parts, including FIGS. 1A, 1B, 1C and 1D. FIG. 1A is the upper left hand quadrant of FIG. 1; FIG. 1B is the upper right hand quadrant of FIG. 1; FIG. 1C is the lower left hand quadrant of FIG. 1; and FIG. 1D is the lower right hand quadrant of FIG. 1.

DETAILED DESCRIPTION

Figure 1B:
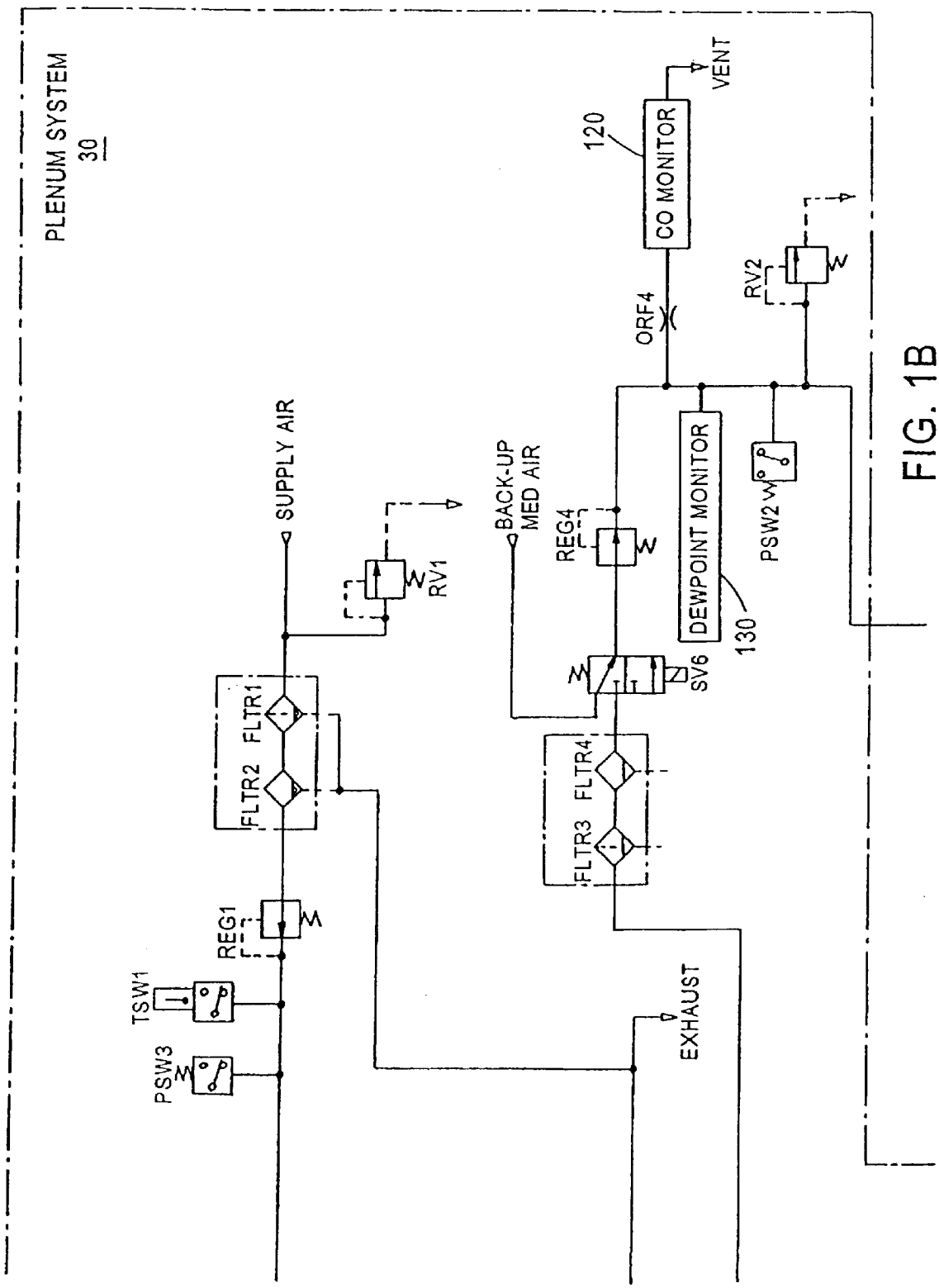
Figure 1C:
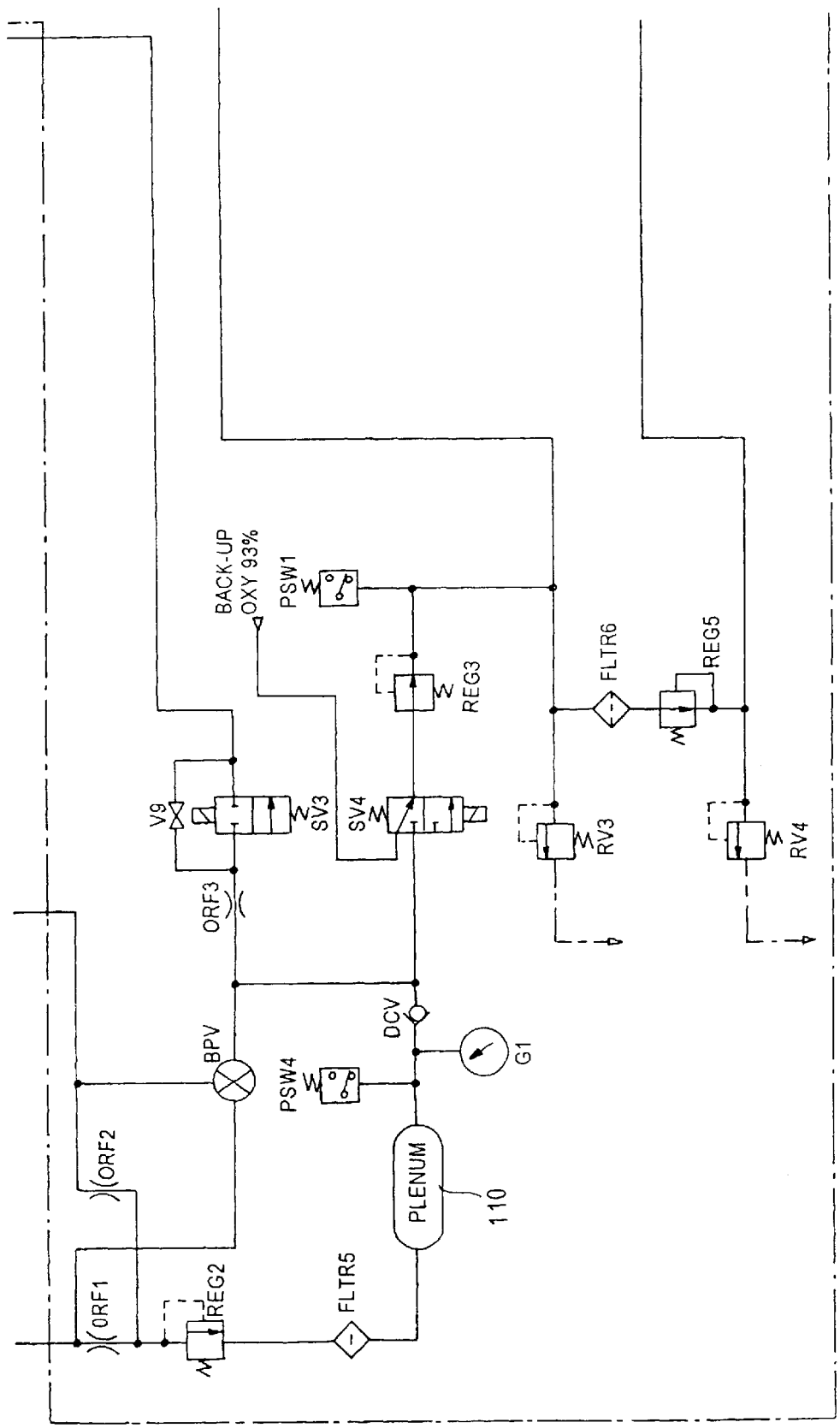
Figure 1D:
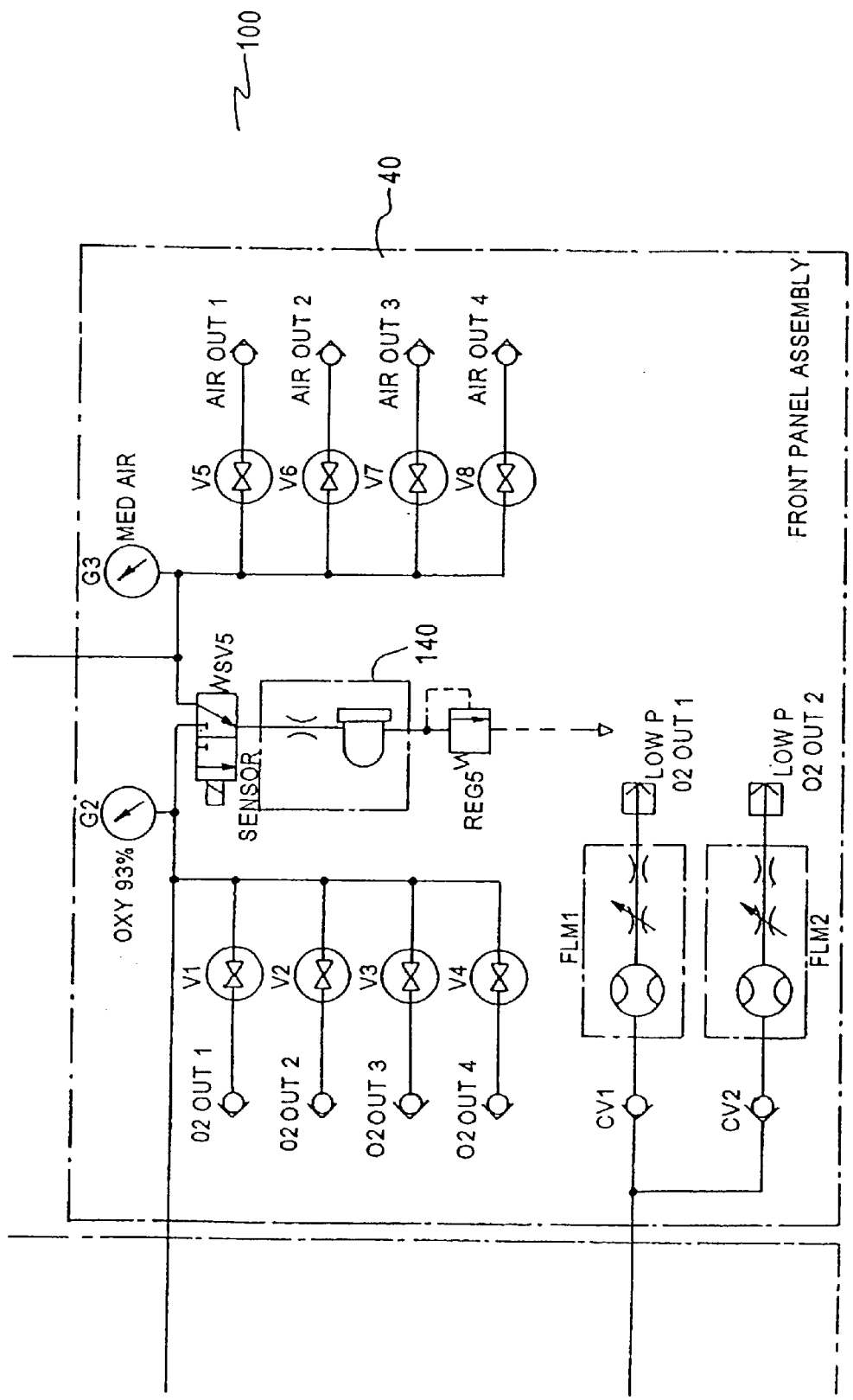

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/value/ ranges may be given, although the present invention is not limited thereto. Still furthermore, any clock or timing signals in the drawing figures are not drawn to scale but rather, exemplary and critical time values are mentioned when appropriate. When specific details are set forth in order to describe example embodiment of the invention, it should be apparent to one skilled in the art that the invention can be practiced without, or with variations of, these specific details. Lastly, it should be apparent that differing combinations of hard-wired control circuitry and software instructions may be used to implement embodiments of the present invention, that is, the present invention is not limited to any specific combination of hardware and software.

An oxygen concentrator system in accordance with the present invention provides a plenum which is used to provide a sufficient flow of oxygen-enriched air under various conditions. The plenum may be selectively bypassed to improve the transient response of the concentrator system. Furthermore, the plenum may be trickle charged when needed so as to maintain the reserve capacity of the plenum.

A charging circuit is provided to trickle charge the plenum when the output pressure of the oxygen PSA sub-systems is higher than the plenum pressure, thereby maintaining the reserve capacity of the plenum.

The plenum reserve capacity can be used to augment the oxygen PSA sub-systems output when there is a high oxygen flow output demand.

Figure 2:
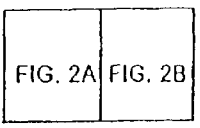
FIGS. 2A and 2B are a simplified pneumatic diagram of the patient ventilator oxygen concentrator system of FIGS. 1A–1D together.
Figure 2A:
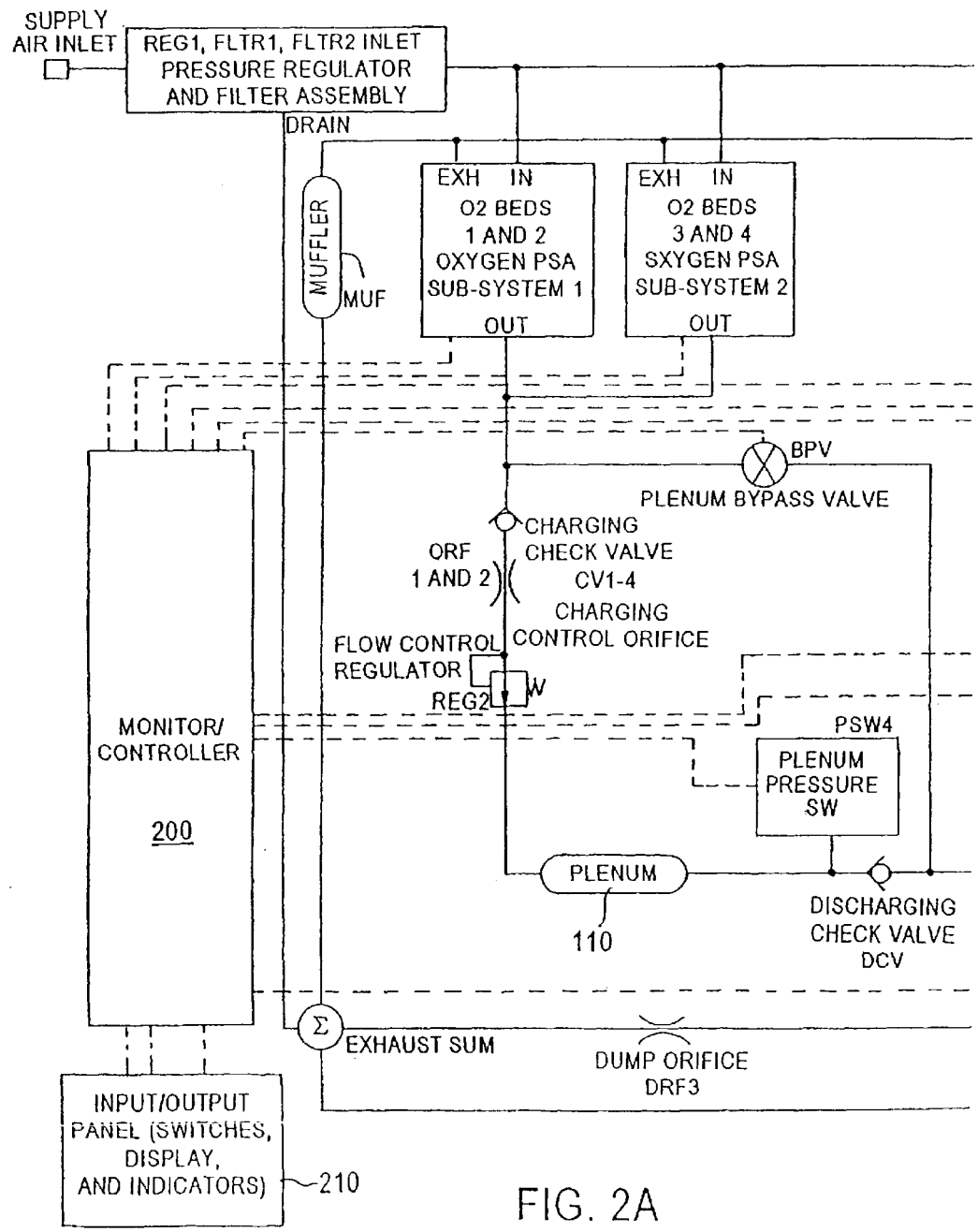
Figure 2B:
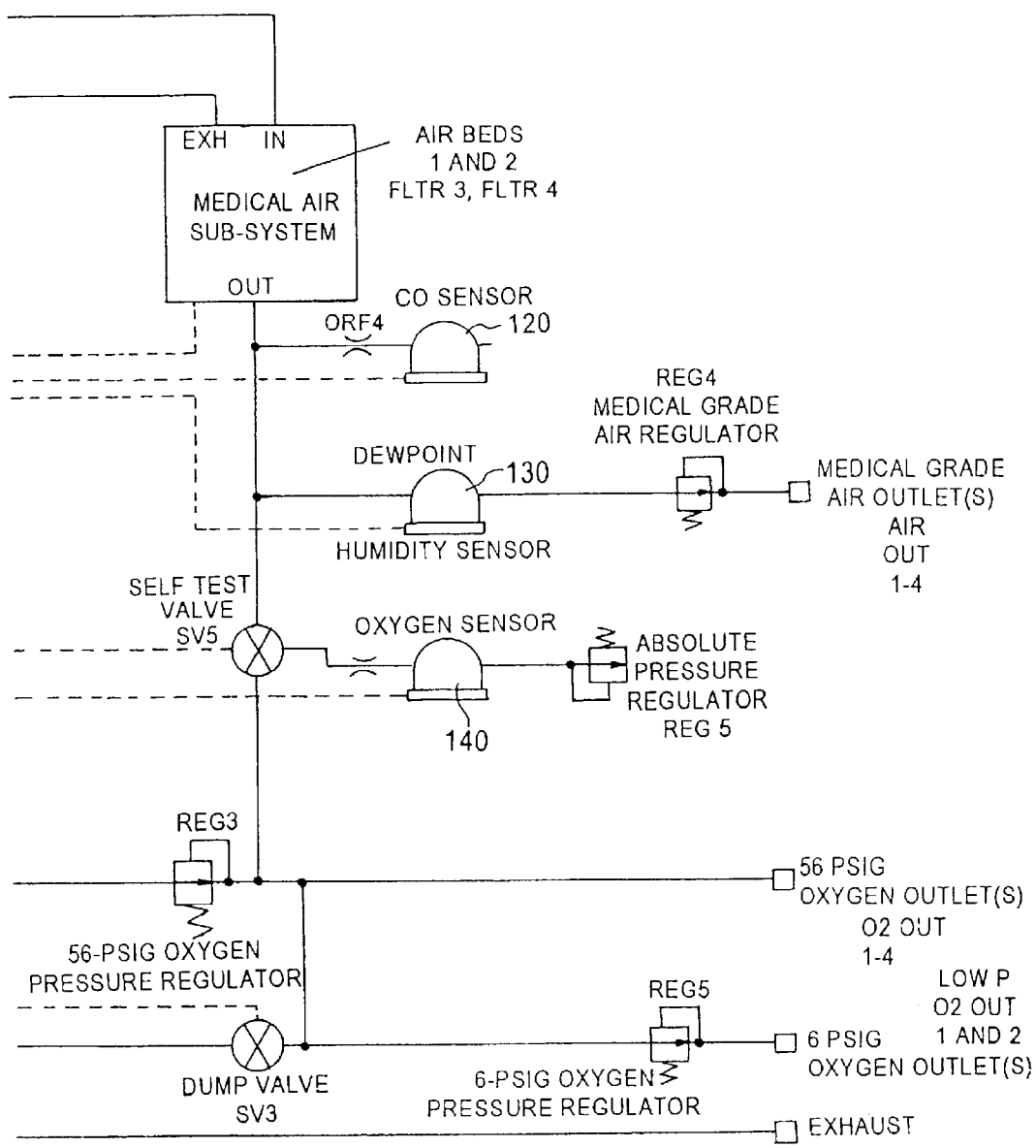

FIGS. 1A–1D together is a pneumatic diagram of a patient ventilator oxygen concentrator system in accordance with an example embodiment of the present invention and FIGS. 2A–2B together is a simplified pneumatic diagram of the patient ventilator oxygen concentrator system of FIGS. 1A–1D together. The following discussion refers both to FIGS. 1A–1D together and FIGS. 2A–2B together.

As illustrated in FIGS. 1A–1D together, the oxygen concentrator system 100 includes three main elements, namely, a plenum system 30, a front panel assembly 40, and a bed module 50. A fourth element of the oxygen concentrator system 100 includes a monitor/controller 200 and input/output electrical panel 210 having switches and indicators and a display. For simplicity, the fourth element of the oxygen concentrator system has been omitted from FIGS. 1A–1D together but is illustrated in FIGS. 2A–2B together.

As illustrated in FIG. 1, supply air is input into the plenum system 30. Relief valve RV1 is provided to protect the system from overpressure. Similarly, relief valves RV2–RV4 are also included in the system to protect against overpressure. After passing through filters FLTR1 and FLTR2, and pressure regulator REG1, the supply air is fed to solenoid valves SV1, SV2, and SV7.

The three two-way solenoid valves SV1, SV7, and SV2 respectively control the inputting of the supply air to the medical air modules AIR-1 and AIR-2 and to the oxygen PSA modules O2-1 and O2-2, O2-3 and O2-4 of the bed module 50. Each of the medical air modules AIR-1 and AIR-2 includes its own three-way solenoid valve SV12 and SV13 which allows the supply air to selectively enter and exit respective air beds 1 and 2.

Similarly, each of the oxygen and PSA modules O2-1 and O2-4 includes its own three-way solenoid valve SV9–SV12 which allows the supply air to selectively enter oxygen beds 1–4. The other connection of all of the three-way solenoids valves SV9–SV12 are connected together to a muffler MUF whose output is connected to an exhaust output of the plenum system 30. Orifices ORF5–ORF7 are respectively disposed between oxygen beds 1 and 2 and between oxygen beds 3 and 4 and between air beds 1 and 2. Check valves CV1–CV6 are respectively connected to the air beds 1 and 2 and the oxygen beds 1–4.

Supply air is provided to FLTR1 and FLTR2 which in turn is pressure regulated by REG1 which is connected to inlet temperature switch TSW1 and to low pressure warning and pressure switch PSW-3.

The output of air beds 1 and 2 are connected via check valves CV1 and CV2 to serially connected filters FLTR3 and FLTR4 whose output is in turn connected via solenoid valve SV6 and regulator REG4 to a medical air line which is connected to the front panel assembly 40. A source of backup medical air, for example, a compressed air tank, is connected to the solenoid valve SV6 so as to provide a continuous source of medical air should the oxygen concentrator system fail.

Various monitoring devices, such as: a carbon monoxide monitor 120 connected to the medical air line via the orifice ORF4 and having an output connected to a vent, a dewpoint monitor 130 connected to the medical air line, the relief valve RV2 connected to the monitor air line, a pressure switch PSW2 for detecting a low-pressure in the medical air line, and a gauge G3 located on the front panel assembly 40 to indicate the actual medical air line pressure, have been provided.

The medical air line is connected to a solenoid valve SV5 so as to be selectively connected to an oxygen sensor 140 which includes a regulator REG5 to control the pressure therethrough. The medical air line is also connected to a manifold having 4 valves V5–V8 whose outputs are respectively connected to AIR OUT 1–4.

The outputs of oxygen beds 1 and 2 are connected together to orifice ORF1 while the outputs of oxygen beds 3 and 4 are connected together to orifice ORF2. The outputs of orifice ORF1 and orifice ORF2 are connected together to the plenum 110 via regulator REG2 and filter FLTR5. The output of the plenum 110 is connected via solenoid valve SV4 and regulator REG3 to an oxygen line on the front panel assembly 40 and via a filter FLTR6 and regulator REG5 to a low-pressure oxygen line on the front panel assembly 40.

The oxygen line on the front panel assembly 40 is connected to a manifold having four valves V1–V4 whose outputs are respectively connected to O2 OUT 1–4. A gauge G2 is located on the front panel assembly 40 and is connected to the oxygen line so as to indicate the actual oxygen line pressure. A plenum pressure gauge G1 and a pressure switch PSW4 as well as orifice ORF3 are also connected to the output of the plenum 110.

The output of the orifice ORF3 is connected via solenoid valve SV3 and valve V9 to the exhaust of the system so as to allow the purging of the contents of the plenum 110. A source of backup oxygen, such as a tank of compressed oxygen, is connected to the solenoid valve SV4 to provide a continuous source of oxygen should the oxygen concentrator system fail. Low pressure warning switch PSW1 and relief valves RV3 and RV4 are also provided.

Lastly, the low-pressure oxygen line is respectively connected via check valves CV1 and CV2 to flow meters FLM1 and FLM2 whose outputs are respectively connected to LOW P O2 OUT 1–2.

Referring to FIGS. 2A–2B together, which is a simplified pneumatic diagram of the patient ventilator oxygen concentrator system of FIGS. 1A–1D together, some elements have been consolidated for simplicity and other elements, such as the relief valves, have not been shown so as not to obscure the features of the system. Similarly, other elements, such as the monitor/controller 200, were not shown in FIGS. 1A–1D together but are shown in FIGS. 2A–2B together.

The operation of the concentrator system illustrated in FIGS. 1 and 2 is as follows. Air is supplied to the supply air inlet where it is received by the inlet pressure regulator and filter assembly REG1, FLTR1 and FLTR2. The pressure regulator REG1 regulates the air pressure of the air supplied to the air inlet so as to be at a constant value, for example, 80 PSIG The filters FLTR1 and FLTR2 remove particulate matter and water which may be present in the air supplied to the air inlet. A line labeled DRAIN is used to convey the removed water to the EXHAUST via an element labeled EXHAUST SUM which may be a manifold, for example. Dump valve SV3 is connected to EXHAUST SUM via dump orifice DRF3 where the dump orifice is a flow rate restriction device restricting the rate of flow of the exhaust to be at an ambient pressure.

The oxygen PSA sub-systems 1 and 2 respectively include oxygen beds 1 and 2 and oxygen beds 3 and 4. Each bed comprises a molecular sieve bed which generates an oxygen product gas by the pressure-swing-adsorption method. Quantitatively, each subsystem may be designed to generate up to 10 liters per minute of oxygen product at an oxygen concentration of 93 +/−3%.

The medical air sub-system consists of air beds 1 and 2 which may each include an activated alumina air dryer bed which operates in the pressure-swing-adsorption mode, a micron filter to remove particulates and an odor removal filter, such as activated charcoal. Quantitatively, the medical grade air sub-system may be designed to generate up to 150 liters per minute of medical air, for example.

Figure 3:
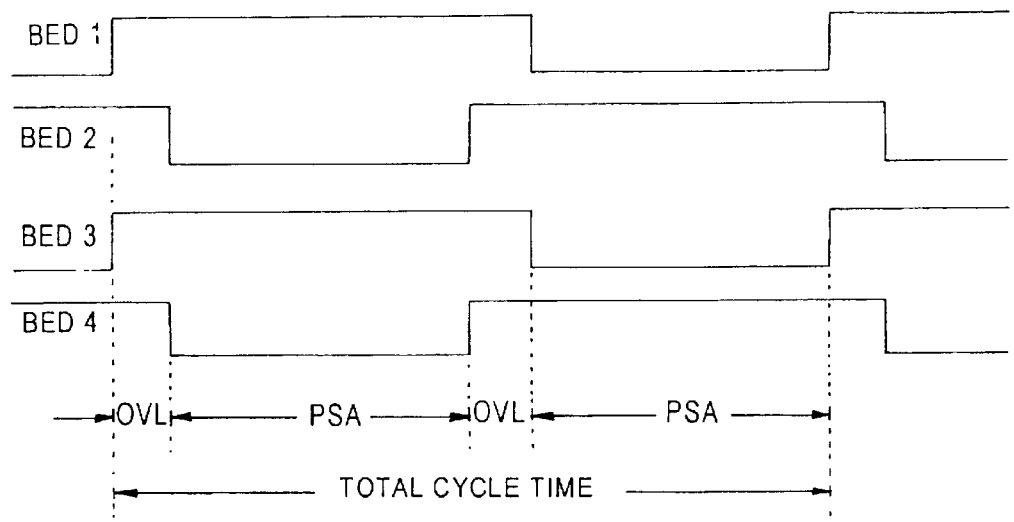
FIG. 3 is a timing diagram illustrating the timing cycles for the oxygen beds of FIGS. 1A–1D together.

As illustrated in FIG. 3, oxygen beds 1–4 are each cycled between a charging cycle and a flushing cycle. PSA beds typically have a charging cycle equal to 55% of the total cycle time and a flushing cycle equal to 45% of the total cycle time. As illustrated in FIG. 3, beds 1 and 2 have an overlap (OVL) and beds 3 and 4 also have an overlap (OVL). As an example, the total cycle time may be on the order of 12 seconds with the overlap time being on the order of 0.5 seconds. By having two sets of oxygen PSA subsystems, it is possible to operate one oxygen PSA subsystem when the demand for oxygen is below a preset amount and to operate both PSA sub-systems when the demand for oxygen exceeds the present amount.

In a similar fashion, air beds 1 and 2 also cycle between a charging cycle and a flushing cycle. As an example, the total cycle time for the air beds may be four times that of the oxygen beds. Accordingly, the total cycle time may be on the order of 48 seconds and the default overlap time may be on the order of 3 seconds with the PSA time being 21 seconds.

Figure 4:
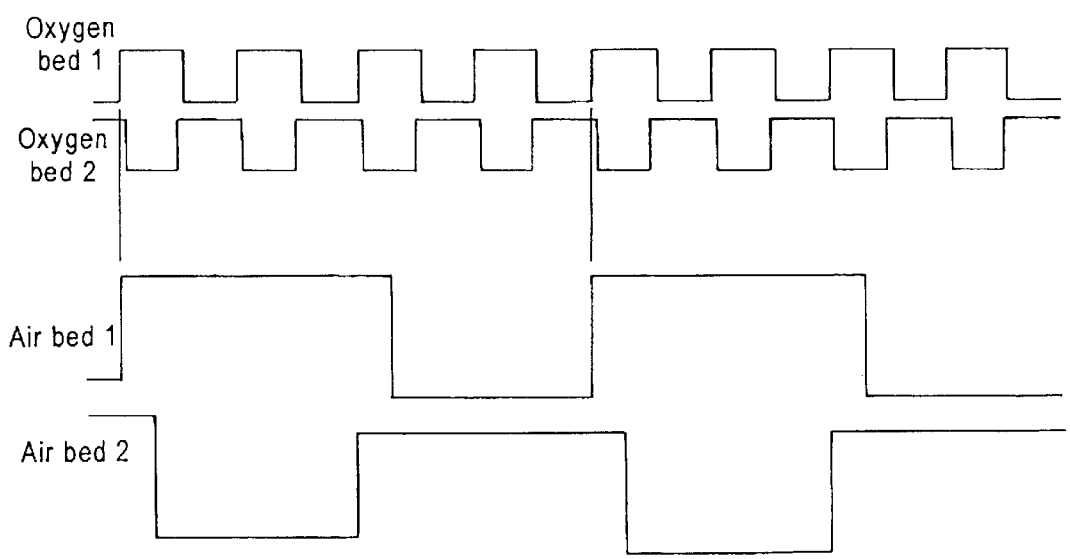
FIG. 4 is a timing diagram illustrating the synchronization between the oxygen beds and air beds of FIGS. 1A–1D together.

FIG. 4 is a timing diagram illustrating the synchronization between the air beds and the oxygen beds. While it is not absolutely necessary for the sets of air beds and oxygen beds to be in synchronization with each other, the synchronization therebetween can simplify the monitor controller/200.

The monitor/controller 200, in conjunction with the input/output panel 210, is used to activate and switch the various valves utilized in the system. Furthermore, in conjunction with the carbon monoxide sensor 120, dewpoint sensor 130 and oxygen sensor 140 and self-test valve SV5, the monitor/controller monitors the oxygen concentration in the oxygen product gas, as well as monitoring the dewpoint level and carbon monoxide level and the oxygen concentration in the medical grade air. Based on the status of the system, as a monitored by the monitor/controller 200, status indications may be displayed on the input/output panel 210 utilizing a digital display or LED indicators, for example.

Since the oxygen sensor 140 output varies with altitude, the absolute pressure regulator REG5 is provided to keep the pressure of the oxygen sensor's chamber at a relatively constant value, for example, 16 PSIA so as to allow the system to operate at various altitudes without requiring the recalibration of the oxygen sensor 140.

The muffler MUF has been provided to reduce the noise caused by the exhausts from the oxygen PSA sub-systems 1 and 2 and the medical air sub-system since it is common to utilize oxygen concentrator systems in hospital environments requiring low noise levels.

Initially, during startup of the system, and particularly when there is no pressure in the plenum 110, the monitor/controller 200 opens the dump valve SV3, that is, allows gas to flow therethrough, and closes the plenum bypass valve BPV, that is, prevents gas from flowing therethrough, so as to flush the plenum 110 of any residual gas contained therein.

The oxygen PSA sub-systems 1 and 2 are then operated so as to produce the output oxygen product which flows through the charging check valves CV1–4 and charging control orifices ORF1 and ORF2 and the flow control regulator REG2 into the plenum 110. The oxygen concentration of the oxygen product leaving the plenum 110 is measured by the oxygen sensor 140.

When the oxygen concentration exceeds a predetermined amount, for example, 90%, as measured by the oxygen sensor 140, the dump valve SV3 is opened so as to allow the oxygen product from the oxygen PSA sub-systems 1 and 2 to charge the plenum 110 via a charging control circuit including the charging check valves CV1–4, the charging control orifices ORF1 and ORF2, and the flow control regulator REG2. The charging control circuit limits the charging rate to a level which is less than a maximum output from the oxygen PSA sub-systems 1 and 2 when the plenum pressure is below the switch point of the plenum pressure switch PSW4, for example, 65 PSIG, so as not to overdraw the oxygen PSA sub-systems 1 and 2.

When the plenum pressure switch PSW4 changes state to indicate to the monitor/controller 200 that the pressure at the output of the plenum 110 is above its setpoint, the monitor/controller 200 opens the plenum bypass valve BPV to allow the oxygen product to flow directly to the various oxygen outlets. The direct flow of the oxygen product to the oxygen outlets rather than flowing through the plenum 110 enables the system to respond faster to transients such as line pressure changes or output flow changes.

When the system is in a high oxygen flow mode, for example, a 65 liters per minute purge flow, the discharging check valve DCV opens due to the pressure drop downstream of the check valve DCV to discharge the plenum 110 and thereby allow the high-pressure purge. The reserve capacity of the plenum 110 is mainly used for purging for short periods of time, such as 18 seconds, for example. Upon the completion of the purging, the charging control circuit trickle charges the plenum 110 when the output pressure of PSA sub-systems 1 and 2 is higher than the plenum pressure. That is, excess capacity of the PSA sub-systems 1 and 2 are used to recharge the plenum to maintain its reserve capacity.

An oxygen concentrator system in accordance with the present invention offers the following advantages:

The charging circuit trickle charges the plenum when the output pressure of the oxygen PSA sub-systems 1 and 2 is higher than the plenum pressure.

The discharging check valve allows the plenum reserve capacity to be used to augment the oxygen PSA sub-systems 1 and 2 output when there is a high oxygen flow output demand.

The plenum bypass valve makes the transient response faster by allowing the output of the oxygen PSA sub-systems 1 and 2 to directly flow to the oxygen concentrator system output ports.

The plenum pressure switch, in conjunction with the monitor/controller, controls the plenum bypass valve to avoid overdrawing the oxygen PSA sub-systems 1 and 2 so as to maintain the oxygen concentration of the oxygen concentrator system output above a predetermined minimum level.

The dump valve allows the plenum to be flushed upon being emptied for long periods of time or when filled with air.

The dump orifice allows sufficient flow to flush the plenum and allows sufficient back pressure to allow a flow through the oxygen sensor to allow the oxygen sensor to monitor the oxygen concentration during startup.

The self-test valve allows for the self-testing of the oxygen sensor.

The oxygen sensor absolute pressure regulator enables the oxygen sensor to operate at higher altitudes without recalibration.

Lastly, the exhausts sum allows excess water removed from the supply air to be flushed out.

This concludes the description of the example embodiment. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangements within the scope of the foregoing disclosure, the drawings, and the appended claims without departing from the spirit of the invention. In addition to variations and modifications in the component parts and/or arrangements, alternative uses will also be apparent to those skilled in the art.

For example, the number of oxygen beds and oxygen PSA sub-systems is not limited to the number shown in the illustrative embodiment. Furthermore, the present invention is not limited to the exact arrangement of solenoid valves, check valves, relief valves, pressure switches, and pressure regulators shown in the illustrative embodiment. Still furthermore, the bypass valve and discharge check valve may be omitted in some configurations.

What is claimed is:

1. A method of increasing oxygen concentration, the method comprising:
 receiving supply air from a system air inlet at an input of at least one oxygen concentrator subsystem and outputting oxygen enriched air to at least one system outlet;
 receiving supply air from a system air inlet at an input of a medical air sub-system and outputting medical grade air to at least one system medical grade air outlet; and
 selectively enabling oxygen-enriched air to flow from the at least one oxygen concentrator subsystem to a plenum.

2. The method of claim 1, wherein receiving supply air in at least one oxygen concentrator subsystem and outputting oxygen-enriched air to at least one system outlet comprises receiving supply air in a pair of oxygen PSA (Pressure Swing Adsorption) beds.

3. The method of claim 1, further comprising metering and controlling the flow of oxygen enriched air between the at least one oxygen concentrator subsystem and the plenum and allowing the flow from the at least one oxygen concentrator subsystem to the plenum.

4. The method of claim 1, further comprising controlling the oxygen enriched air pressure between the plenum and the at least one system outlet.

5. The method of claim 1, further comprising controlling the air pressure between the system air inlet and the at least one oxygen concentrator subsystem.

6. The method of claim 1, further comprising filtering air flowing between the system air inlet and the at least one oxygen concentrator subsystem.

7. The method of claim 6, further comprising exhausting waste products resulting from filtering air flowing between the system air inlet and the at least one oxygen concentrator subsystem.

8. The method of claim 1, wherein filtering air flowing between the system air inlet and the at least one oxygen concentrator subsystem comprises at least one of particulate filtering and water vapor filtering.

9. The method of claim 1, further comprising exhausting waste products from the at least one oxygen concentrator subsystem.

10. The method of claim 1, further comprising selectively dumping waste products from the at least one oxygen concentrator subsystem and the plenum.

11. The method of claim 1, further comprising allowing oxygen enriched air to flow only between the plenum and the at least one system outlet.

12. The method of claim 1, further comprising regulating the flow of air between the medical air subsystem and the at least one system medical grade air outlet.

13. The method of claim 1, further comprising measuring the oxygen concentration of the oxygen-enriched air at the at least one system outlet with an oxygen sensor.

14. The method of claim 13, further comprising regulating the absolute pressure of the oxygen-enriched air flowing to the oxygen sensor to control the air pressure thereof so as to be independent of altitude.

15. The method of claim 1, further comprising detecting a carbon monoxide concentration and a dew point of the medical grade air at the at least one system medical grade air outlet.

16. The method of claim 1, further comprising trickle charging the plenum upon the at least one oxygen concentrator sub-system air pressure being greater than the plenum air pressure.

17. The method of claim 1, further comprising selectively bypassing the plenum to enable oxygen enriched air to flow from the at least one oxygen concentrator system to the at least one system outlet.

18. An oxygen concentrator system comprising:
 a system air inlet to receive supply air;
 at least one system outlet to output oxygen-enriched air;

at least one system outlet to output medical grade air;

a medical air sub-system to receive supply air from the system air inlet and to supply medical grade air to the at least one system medical grade air outlet;

at least one oxygen concentrator subsystem including an input to receive supply air from the system air inlet and an output to output medical grade air to the at least one system outlet; and a plenum and a plenum charging system located between the output of the at least one oxygen concentrator subsystem and the at least one system outlet, the plenum charging system selectively enabling oxygen-enriched air to flow from the at least one oxygen concentrator subsystem to the plenum.

19. The system of claim 18, wherein the at least one oxygen concentrator subsystem comprises a pair of oxygen PSA (Pressure Swing Adsorption) beds.

20. The system of claim 18, wherein the plenum charging system comprises a charging check valve and a charging control orifice and a flow control regulator connected serially together to meter and to control the flow of oxygen enriched air between the at least one oxygen concentrator subsystem and the plenum and to allow the flow of oxygen enriched air only from the at least one oxygen concentrator subsystem to the plenum.

21. The system of claim 20, wherein the charging check valve and charging control orifice and flow control regulator allow the flow of air from the at least one oxygen concentrator sub-system to the plenum to trickle charge the plenum upon the at least one oxygen concentrator sub-system air pressure being greater than the plenum air pressure.

22. The system of claim 18, further comprising at least one pressure regulator located between the plenum and the at least one system outlet to control the oxygen enriched air pressure there through.

23. The system of claim 18, further comprising an inlet pressure regulator located between the system air inlet and the at least one oxygen concentrator subsystem to control the air pressure therethrough.

24. The system of claim 18, further comprising an inlet filter assembly located between the system air inlet and the at least one oxygen concentrator subsystem.

25. The system of claim 24, wherein the inlet filter assembly comprises at least one of a particulate filter and a water vapor filter.

26. The system of claim 24, further comprising a system exhaust to exhaust waste products from the inlet filter assembly.

27. The system of claim 18, further comprising a system exhaust to exhaust waste products from the at least one oxygen concentrator subsystem.

28. The system of claim 27, further comprising a dump valve and a dump orifice located between the at least one system outlet and the system exhaust to selectively dump waste products from the at least one oxygen concentrator subsystem and the plenum.

29. The system of claim 27, further comprising a muffler located between the system exhaust and the at least one oxygen concentrator subsystem to muffle noise emanating therefrom.

30. The system of claim 18, further comprising a discharging check valve located between the plenum and the at least one system outlet to allow air flow only between the plenum and the at least one system outlet.

31. The system of claim 18, further comprising a medical grade air regulator located between the medical air subsystem and the at least one system medical grade air outlet to regulate the air pressure output therefrom.

32. The system of claim 18, further comprising an oxygen sensor selectively connected to the at least one system outlet to measure the oxygen concentration of the oxygen-enriched air.

33. The system of claim 32, further comprising an absolute pressure regulator connected to the oxygen sensor to control the air pressure thereof so as to be independent of altitude.

34. The system of claim 18, further comprising at least one of a carbon monoxide detector and a dew point detector to respectively detect the carbon monoxide concentration and the dew point of the medical grade air.

35. The system of claim 18, further comprising a plenum bypass valve to selectively bypass the plenum so as to enable oxygen enriched air to flow from the at least one oxygen concentrator subsystem to the at least one system outlet.

* * * * *